(12) United States Patent
Stadler

(10) Patent No.: US 7,107,374 B1
(45) Date of Patent: Sep. 12, 2006

(54) METHOD FOR BUS MASTERING FOR DEVICES RESIDENT IN CONFIGURABLE SYSTEM LOGIC

(75) Inventor: Laurent Stadler, San Francisco, CA (US)

(73) Assignee: XILINX, Inc., San Jose, CA (US)

( * ) Notice: Subject to any disclaimer, the term of this patent is extended or adjusted under 35 U.S.C. 154(b) by 431 days.

(21) Appl. No.: 09/947,298

(22) Filed: Sep. 5, 2001

(51) Int. Cl.
G06F 13/00 (2006.01)
G06F 13/36 (2006.01)

(52) U.S. Cl. .................. 710/107; 710/22; 710/113; 710/241; 710/308

(58) Field of Classification Search ............... 710/107, 710/113, 308, 241
See application file for complete search history.

(56) References Cited

U.S. PATENT DOCUMENTS

| | | | |
|---|---|---|---|
| 5,175,836 A | 12/1992 | Morgan | |
| RE34,363 E | 8/1993 | Freeman | |
| 5,361,373 A | 11/1994 | Gilson | |
| 5,499,385 A | 3/1996 | Farmwald et al. | |
| 5,668,815 A | 9/1997 | Gittinger et al. | |
| 5,677,638 A | 10/1997 | Young et al. | |
| 5,687,325 A | 11/1997 | Chang | |
| 5,710,891 A | 1/1998 | Normoyle et al. | |
| 5,774,684 A | 6/1998 | Haines et al. | |
| 5,834,947 A | 11/1998 | Cedar et al. | |
| 5,862,353 A * | 1/1999 | Revilla et al. ............... | 710/107 |
| 5,890,002 A * | 3/1999 | Li et al. ..................... | 710/260 |
| 5,901,295 A | 5/1999 | Yazdy | |
| 5,935,230 A | 8/1999 | Pinai et al. | |
| 5,936,424 A | 8/1999 | Young et al. | |
| 6,047,336 A * | 4/2000 | Green, III et al. ............ | 710/22 |
| 6,085,317 A | 7/2000 | Smith | |
| 6,154,793 A | 11/2000 | MacKenna et al. | |
| 6,212,625 B1 | 4/2001 | Russell | |
| 6,223,238 B1 * | 4/2001 | Meyer et al. ................ | 710/312 |

(Continued)

FOREIGN PATENT DOCUMENTS

EP    0062431 A1    10/1942

(Continued)

OTHER PUBLICATIONS

J.C. Logue and W.W. Wu, "System Master Slice for Fast Turn-around Time," XP000714153, IBM Technical Disclosure Bulletin, vol. 26, No. 3B, pp. 1531-1532 (Aug. 1, 1983).

(Continued)

*Primary Examiner*—Rehana Perveen
*Assistant Examiner*—Nimesh Patel
(74) *Attorney, Agent, or Firm*—Blakeley Sokoloff; John J. King

(57) ABSTRACT

A processor is connected to a configurable system interconnect (CSI) bus. A CSL is connected to the CSI bus. The CSL comprises a first set of signal lines to send a data transfer request and a second set of signal lines to receive a grant associated with the data transfer request. A bus master unit (BMU) is coupled with the CSL through the first set of signal lines and the second set of signal lines. The BMU is connected to the CSI bus. The BMU arbitrates to take control of the CSI bus on behalf of the CSL enabling the CSL to perform data transfer to or from the CSI bus bypassing the processor.

41 Claims, 8 Drawing Sheets

U.S. PATENT DOCUMENTS

| | | | |
|---|---|---|---|
| 6,347,346 B1 | 2/2002 | Taylor | |
| 6,363,445 B1 * | 3/2002 | Jeddeloh | 710/113 |
| 6,467,009 B1 | 10/2002 | Winegarden et al. | |
| 6,601,126 B1 * | 7/2003 | Zaidi et al. | 710/305 |
| 6,658,502 B1 * | 12/2003 | Story et al. | 710/22 |
| 6,691,266 B1 | 2/2004 | Winegarden et al. | |
| 6,792,527 B1 * | 9/2004 | Allegrucci | 713/1 |
| 2003/0182486 A1 * | 9/2003 | Taylor et al. | 710/305 |

FOREIGN PATENT DOCUMENTS

| | | |
|---|---|---|
| EP | 0361525 A2 | 4/1990 |

OTHER PUBLICATIONS

Steve Farrer, "High Speed Numerics with the 80186/80188 and 8087," Intel Corporation, Embedded Applications vol. 1, Application Note AP-258, pp. ix-xii and 4-1 to 4-18 (1995).

Intel Corporation, "Embedded Microprocessors: *Intel 386™ Processors, Intel376 Processors and Peripherals, 80186/80188 Family*," pp. ix-x and 1-1 to 1-32 (1995).

Intel Corporation, "Peripheral Components: *Chips Sets, PC I/O Peripherals, Memory Controllers, Keyboard Controllers, Support Peripherals*," pp. ix-xi and 1-57 to 1-247 (1995).

* cited by examiner

METHOD FOR BUS MASTERING FOR DEVICES RESIDENT IN CONFIGURABLE SYSTEM LOGIC

FIELD OF THE INVENTION

The present invention relates generally to the field of logic design. More specifically, the present invention relates to a method and an apparatus for bus mastering for devices in configurable system logic (CSL).

BACKGROUND

A Configurable System-on-Chip (CSoC) is a single-chip combination of an industry-standard microprocessor, embedded programmable logic, memory and a dedicated system bus. In addition to the processor, the CSoC may incorporate many dedicated system features including a cache memory, an external memory interface unit, and a DMA controller. These features are integrated with a dedicated configurable system interconnect (CSI) bus and embedded field programmable logic array (FPGA). This FPGA is also referred to as configurable system logic or CSL.

FIG. 1 is a block diagram illustrating an example of a prior art configurable system-on-chip (CSoC). The CSoC includes a CSL 110, a direct memory access (DMA) controller 125, a central processing unit (CPU) 105, and a CSI bus 100. The DMA controller 125 may have multiple DMA channels (e.g., four). Typically, the CPU 105 or the DMA controller 125 can master the CSI bus 100 while the CSL 110 cannot. The CSI bus 100 is connected with the DMA controller 125. The CSI bus 100 is also connected with the CSL 110, but the CSL 110 is only a slave on the CSI bus 100.

Bus mastering refers to a feature that enables a controller connected to the bus to communicate directly with other devices on the bus without going through the CPU. Most modern bus architectures support bus mastering because it improves performance.

Generally, there are bus signals driven to the CSL 110 containing addresses, and there are bus signals coming from the CSL 110 containing data. Although the CSL 110 is capable of providing data, it is not capable of specifying addresses, direction of data or transaction size. The CSL 110 can send or receive data through transactions with the DMA controller 125. The DMA controller 125 acts as the bus master of the CSI bus 100. For a particular DMA channel, transactions between the CSL 110 and the DMA controller 125 are carried out in one direction and in one transaction size (e.g., 8, 16 or 32 bits). In addition, the address of the transactions follow a fixed pattern, incrementing, decrementing, or starting at the same address. The CSL does not have the ability to specify addresses.

SUMMARY OF THE INVENTION

In one embodiment, a system with a bus-mastering configurable system logic (CSL) is dislocated. A processor is connected to a configurable system interconnected (CSI) bus. A CSL is connected to the CSI bus. The CSL comprises a first set of signal lines to send a data transfer request and a second set of signal lines to receive a grant associated with the data transfer request. A bus master unit (BMU) is coupled with the CSL through the first set of signal lines and the second set of signal lines. The BMU is connected to the CSI bus. The BMU arbitrates to take control of the CSI bus on behalf of the CSL enabling the CSL to perform data transfer to or from the CSI bus bypassing the processor.

Other features and advantages of the present invention will be apparent from the accompanying drawings and from the detailed description that follows below.

BRIEF DESCRIPTION OF THE DRAWINGS

The present invention is illustrated by way of example, and not limitation, in the figures of the accompanying drawings in which like references indicate similar elements and in which.

DETAILED DESCRIPTION

A method and an apparatus for adding bus-mastering capability to configurable system logic (CSL) are disclosed. The bus-mastering capability allows a CSL device in the CSL to request and receive access to a system bus in order to transmit data to or receive data from the system bus.

In the following description, CSI stands for a configurable system interconnect bus. CSL stands for configurable system logic. A "CSL device" is a programming of all or part of the CSL to implement a particular function. A "CSL master" is a soft peripheral in the CSL acting as a bus master. A "channel" refers to a dedicated connection between the CSL and the CSI bus over which the signaling for DMA and bus mastering transactions occur (in the context of DMA or bus master operations). Incoming data path refers to the set of CSI bus signals going from the CSI bus to the CSL. A "read" is a data transfer from the CSI bus to the CSL device. A "return data path" is a set of CSI bus signals going from CSL to the CSI bus. A "write" is a data transfer from the CSL device to the CSI bus.

Figure 1:
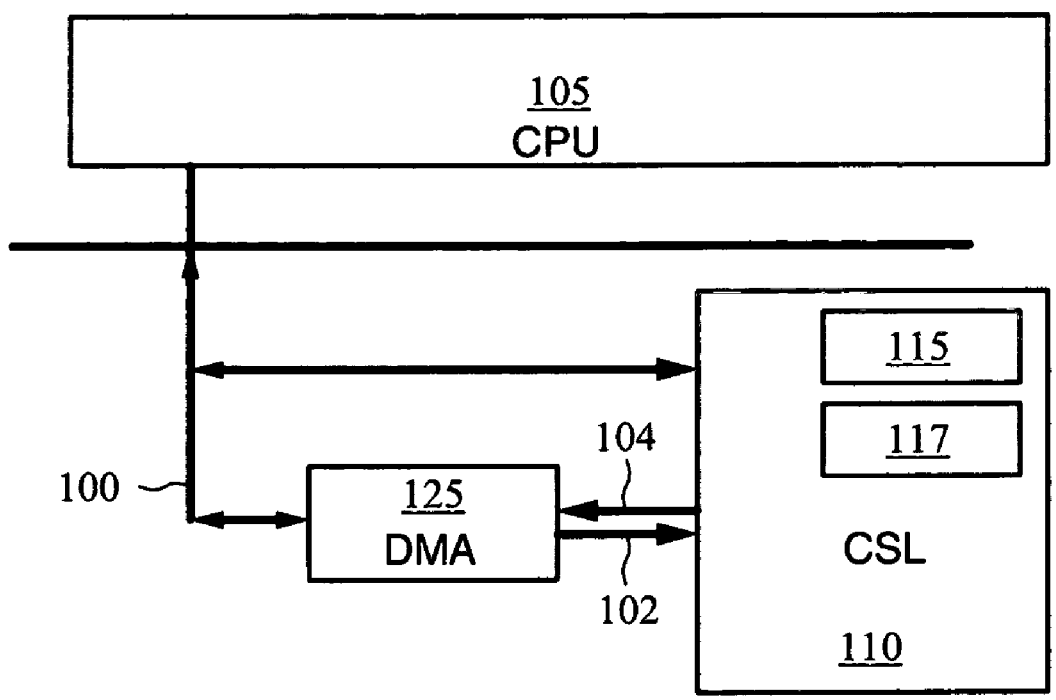
FIG. 1 is a block diagram illustrating an example of a prior art configurable system-on-chip (CSoC).

Referring to FIG. 1, the CSL 110 includes CSL devices 115 and 117. Generally, the CSL includes CSL bus signal lines for outgoing and incoming bus signals. For example, the CSL 110 may include two outgoing point-to-point bus signal lines 104 and two incoming point-to-point bus signal lines 102. These bus signal lines carry bus signals between the CSL 110 and the DMA 125. The bus signal lines 102, 104 are not connected with the CSI bus 100. Only one CSL device can use a particular set of lines at any one time.

Figure 2:
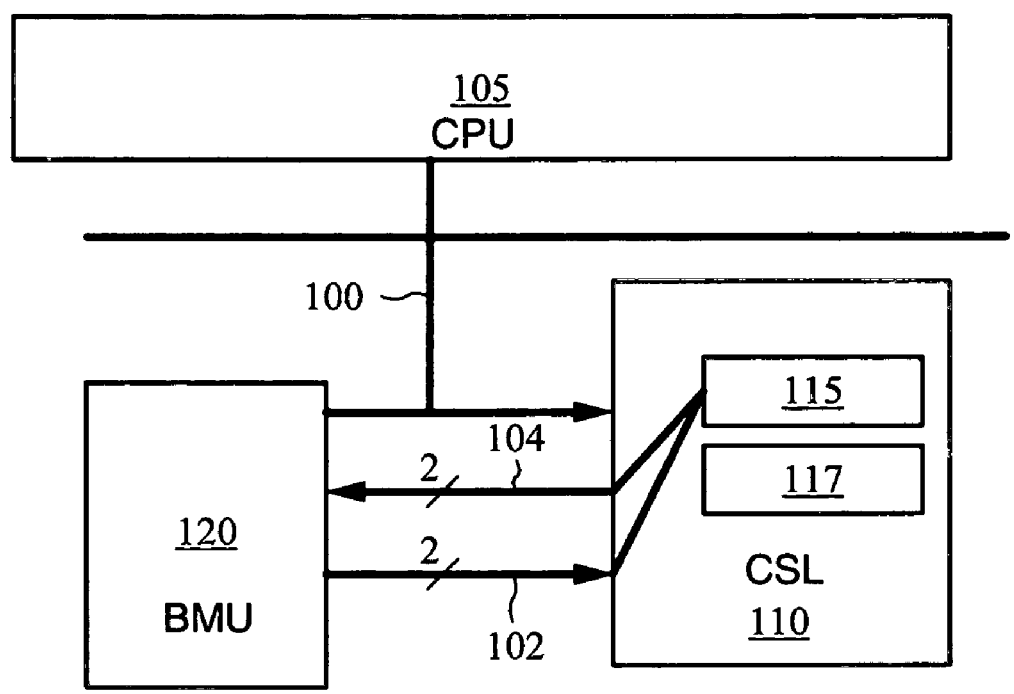
FIG. 2 is a block diagram illustrating a CSoC with a bus master unit.

FIG. 2 is a block diagram illustrating a CSoC with a bus master unit (BMU). A CSL device 115 that needs to access the CSI bus 100 has a dedicated set of signals going to and from the BMU 120, which will allow the CSL device 115 to issue commands and receive responses from the BMU 120. Each set of signals will be referred to as a channel. In many cases, these signals will be compatible with those used when the CSL 110 is connected to a DMA (as illustrated in FIG.

1). In one embodiment, any set of dedicated signals can be configured for either DMA connection or BMU connection.

Bus-mastering capability is added to the CSL 110 using the set of dedicated signal lines 102, 104. The signal lines 102, 104 are used for handshaking with the BMU 120. For example, the signal line 104 may be used to send commands (e.g., read, write, burst) from the CSL device 115 to the BMU 120. The signal line 102 may be used to send grant commands (e.g., address grant, read grant, write grant) from the BMU 120 to the CSL device 115. There may be two bus signal lines 104 used for requests and two bus signal lines 102 used for grants. The BMU 120 essentially acts as a proxy master for a CSL device 115, 117 in the CSL 110.

In one embodiment, bus-mastering cycles use a time-multiplexed address/data system with separate address and data phases. For example, write address, read address and write data are sent from the CSL device 115 to the CSI bus 100 via a return data path. Read data is sent from the CSI bus 100 to the CSL device 115 via an incoming data path. The address phase and the data phase of the CSI bus 100 are indicated to the CSL device 115 via the signal lines 102 relieving the CSL device 115 from having to track the state of the bus.

Figure 3:
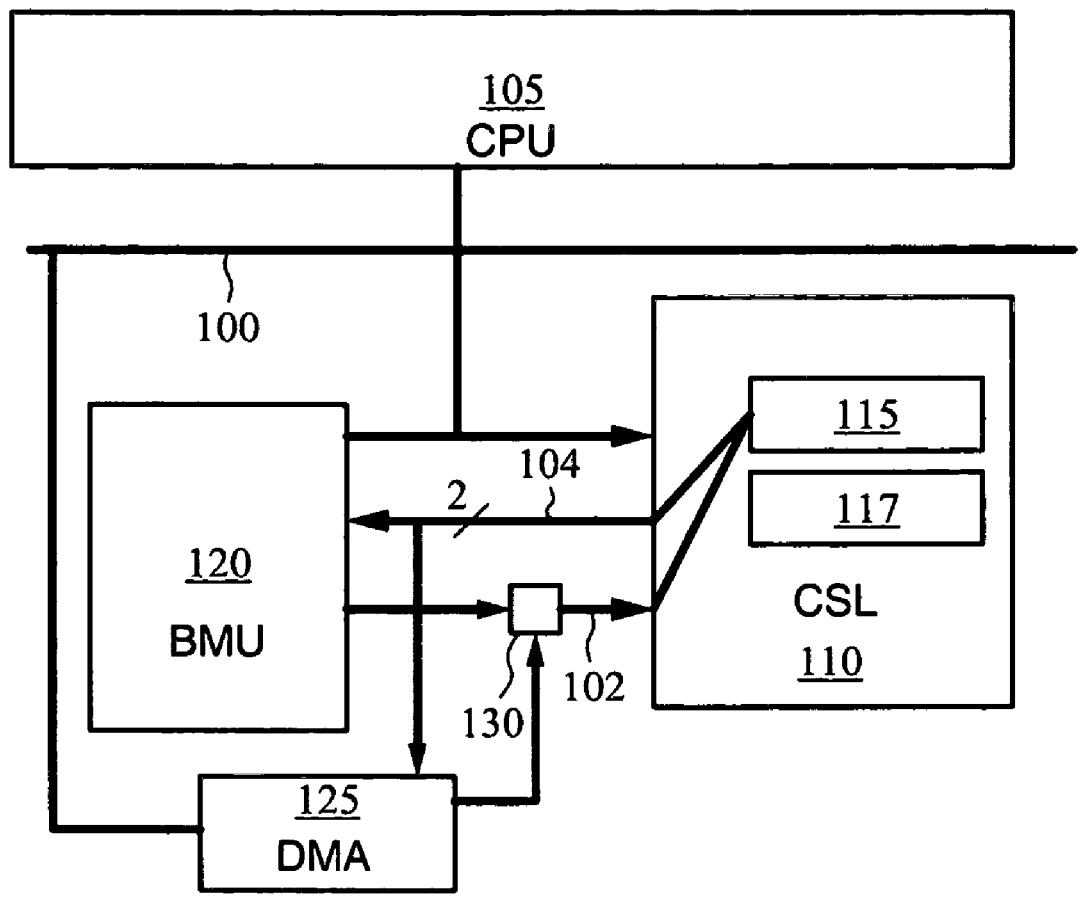
FIG. 3 is a block diagram illustrating a CSoC with a bus master unit and a DMA controller.

FIG. 3 is a block diagram illustrating a CSoC with a bus master unit and a DMA controller. As described above, there are two point-to-point request lines and two point-to-point grant lines (signal lines 102, 104) connecting the CSL device 115 and the BMU 120. With the two request lines, following are four possible requests from the CSL device 115 to the BMU 120:

| | |
|---|---|
| (00) NO_REQUEST | The CSL is not issuing a request to the BMU. |
| (01) READ_REQUEST | The CSL requests a read transaction. |
| (10) WRITE_REQUEST | The CSL requests a write transaction. |
| (11) BURST_REQUEST | The CSL requests a burst transaction. |

Similarly, with the two grant lines, following are four possible grants from the BMU 120 to the CSL device 115:

| | |
|---|---|
| (00) NO_GRANT | The BMU is not granted access to ANY of the common CSI signals nor are any common signals intended for the BMU. |
| (01) ADDRESS_GRANT | The BMU is granted access to the return data path and should provide an address on it. |
| (10) WRITE_GRANT | The BMU is granted access to the return data path and should provide write data on it. |
| (11) READ_GRANT | The BMU is being provided with read data on the incoming data path. No access is granted to the return data path. |

When there is a burst request, the BMU 120 performs a transaction in the same direction as a previous transaction, and either at the same address as the last transaction or at the address plus the transaction size. For example, if the previous transaction was a byte read operation, and the request lines indicate a burst request, the BMU 120 performs the same write operation at the same address or at that address plus one byte. Thus, by using the burst request type, the address phase is not used. The address is based on the previous transaction.

In one embodiment, the signal lines 102, 104 may be connected to both the BMU 120 and the DMA 125. For example, request signals from the CSL device 115 may be sent to both the BMU 120 and the DMA 125. A multiplexer 130 may be used to send grant signals from either the BMU 120 or the DMA 125 to the CSL device 115. Thus, when a channel is being used for bus mastering, only grant signals from the BMU 120 are allowed to pass through the multiplexer 130 to the CSL device 115.

When the BMU 120 takes control of the CSI bus 100, the BMU 120 sets bus mode bits to indicate that access to the CSI bus 100 is on behalf of a CSL device. The BMU 120 samples request lines from each channel to see if there is a request to be processed. In one embodiment, there is a limit to a number of outstanding requests the CSL device 115 can issue (e.g., up to 16 outstanding requests). Any subsequent requests will be ignored. The requests will be serviced by the BMU 120 in the order that they are queued. When a request requires an address grant, there will be no other grants issued to that channel between the address grant and the corresponding read grant or write grant. For example, consider the following request queue with read (R), write (W) and burst (B) requests with an earliest request on the left and a latest request on the right.

Request Queue: RWWBB

The grant order for this request queue is:

Grant order: Address Grant
    Read Grant
    Address Grant
    Write Grant
    Address Grant
    Write Grant
    Write Grant
    Write Grant The above example only illustrates the relative orders of request and grant and not the timing.

Figure 4:
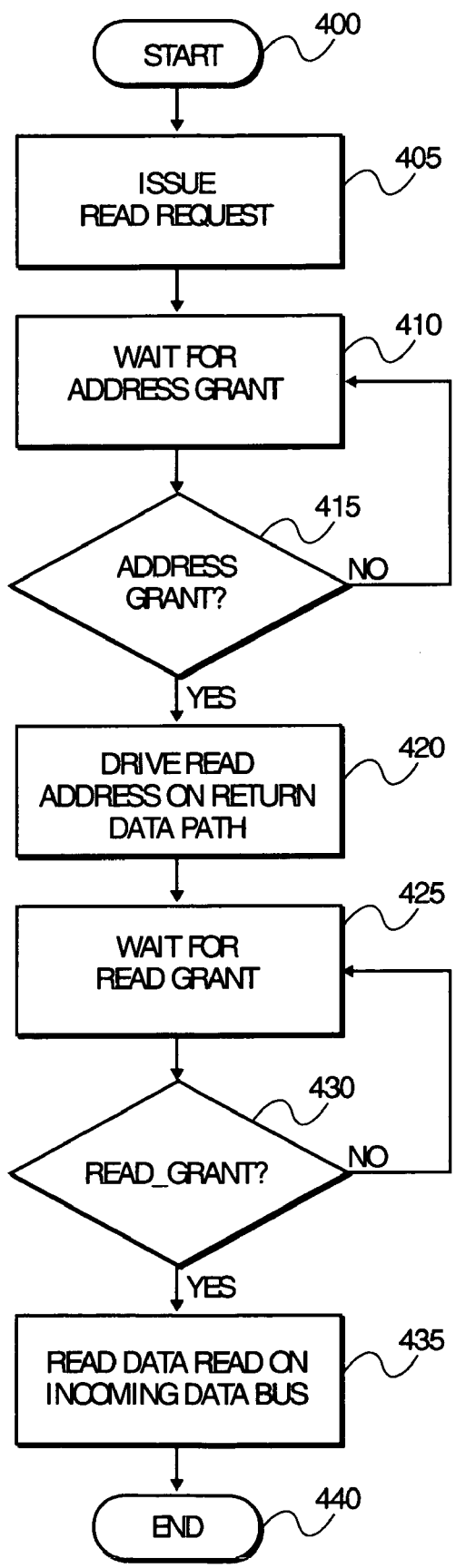
FIG. 4 is a flow diagram illustrating one embodiment of a CSL data read process.

FIG. 4 is a flow diagram illustrating one embodiment of a CSL data read process. The read process starts at block 400. At block 405, a CSL device in a CSL issues a read request to the BMU. The request indicates that the CSL device wants read data from the CSI bus. In one embodiment, the BMU will latch this request. Thus, the CSL should be designed to only issue the request for one clock if it only wishes to issue one request.

At block 410, the CSL device waits for the BMU to send an address grant command. When the BMU receives the read request, it arbitrates for the shared CSI bus. When the BMU takes control of the CSI bus (including address bus and data bus), it then sends an address grant command to the CSL device. At block 415, a determination is made to see if the address grant command is received from the BMU. If the address grant command is not received, the process flows to block 410 where the CSL device continues to wait.

From block 415, if the address grant command is received from the BMU, the process moves to block 420 where the CSL sends a read address to the BMU. The read address is an address that the CSL device wants to read data from. The read address is sent to the BMU through the return data path of the CSI bus and stored in the BMU. Along with the read address, the CSL may also send a requested data size.

The CSL device then waits for the read grant command from the BMU, as shown in block 425. In the mean time, the BMU arbitrates for the shared CSI bus a second time. When the BMU takes control of the CSI bus, the BMU performs a read from the address supplied by the CSL device to get data at that address. The BMU then arbitrates for the shared CSI bus for a third time. When it has control of the CSI bus, the BMU then sends a read grant command and places the data on the incoming data path of the CSI bus.

From block 425, the process flows to block 430 where a determination is made to see if a read grant command is received from the BMU. If not, the process flows back to block 425 where the CSL device continues to wait for the read grant command. When the read grant command is received, the process flows from block 430 to block 435 where the CSL device reads the data sent by the BMU. The process is complete and ends at block 440.

Figure 5:
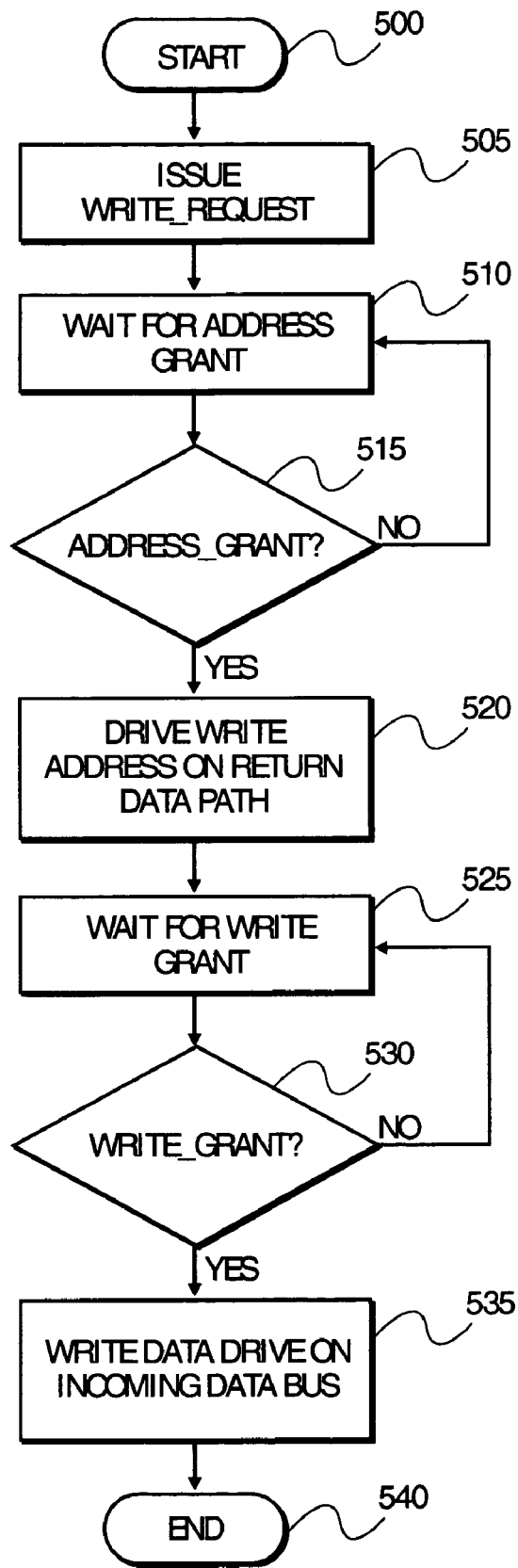
FIG. 5 is a flow diagram illustrating one embodiment of a CSL data write process.

FIG. 5 is a flow diagram illustrating one embodiment of a CSL data write process. The process starts at block 500. At block 505, a CSL device issues a write request command. In one embodiment, the BMU latches this command so the CSL should only issue the command for one clock if it only wishes to issue one request. At block 510, the CSL device waits for an address grant command from the BMU. At block 515, a determination is made to see if the address grant command is received from the BMU. If no address grant command is received, the process flows from block 515 back to block 510 and the CSL continues to wait. Note that the BMU will arbitrate for the CSI bus and at some point it will get control of the CSI bus. When this happens, the BMU will issue the address grant command to the CSL.

When the address grant command is received, the process flows from block 515 to block 520 where the CSL device sends write data address to the BMU. The CSL device does this by placing the write data address onto the return data path. The CSL device may also send a requested write size to the BMU. The BMU arbitrates the CSI bus and at some point takes control of the CSI bus. It then reads the write data address from the CSL device. The write data address may be stored in a register in the BMU.

At block 525, the CSL device waits for write grant command from the BMU. At block 530, a determination is made to see if the write grant command is received from the BMU. If the write grant command is not received, the process flows back to block 525 where the CSL device continues to wait. At some point, the BMU will issue the write grant command. When the write grant command is received, the process flows from block 530 to block 535 where the CSL device sends write data to the BMU by placing the write data on the return data path of the CSI bus. The BMU then takes control of the CSI bus and receive the write data. The BMU then performs a write operation using the address and write data. The process is complete and ends at block 540. In one embodiment, the address grant command and the write command may be asserted simultaneously.

The following sections describe burst requests. The burst requests can be associated with a "read request" or with a "write request". Although there is no separate "burst read request" and "burst write request", when the burst request is associated with a "read request", it is referred to as a "burst read request", and when the burst request is associated with a "write request", it is referred to as a "burst write request". Thus, the direction of the burst requests is implied by a previous request (either read or write).

Figure 6:
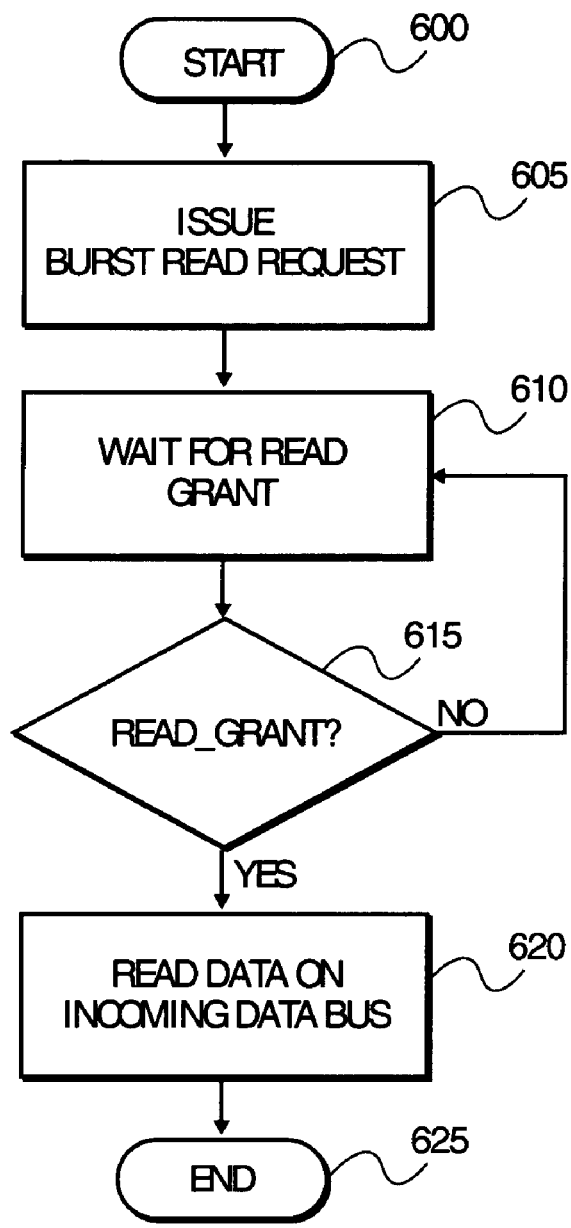
FIG. 6 is a flow diagram illustrating one embodiment of a CSL burst read process.

FIG. 6 is a flow diagram illustrating one embodiment of a CSL burst read process. If the last request issued by the BMU was a read request, then the CSL device can issue the burst read request. The process starts at block 600. The CSL device initiates the burst read transaction by issuing a burst request, as shown in block 605. As described above, the direction of this burst read transaction is implicitly determined by the direction (read or write) of the last transaction completed by the BMU. In this case, because the last transaction was a "read", the direction of the burst request is similar to that of a "read". The address is implicitly determined from the address of the last transaction, which may be incremented by some amount dependent on the burst settings for that channel. Since the address is implicit, there is no address grant phase. The BMU then reads the data using the address determined from the last transaction.

At block 610, the CSL device waits for a read grant command from the BMU. At block 615, a determination is made to see if the read grant command is received from the BMU. If the read grant command is not received, the process flows from block 615 back to block 610 where the CSL device continues to wait. When the BMU receives the read data, the BMU will issue the read grant command to the CSL device. From block 615, when the read grant command is received, the process flows to block 620 where the data is read from the incoming data path of the CSI bus. The CSL device should latch the incoming data during this cycle. The process is complete and ends at block 625.

Figure 7:
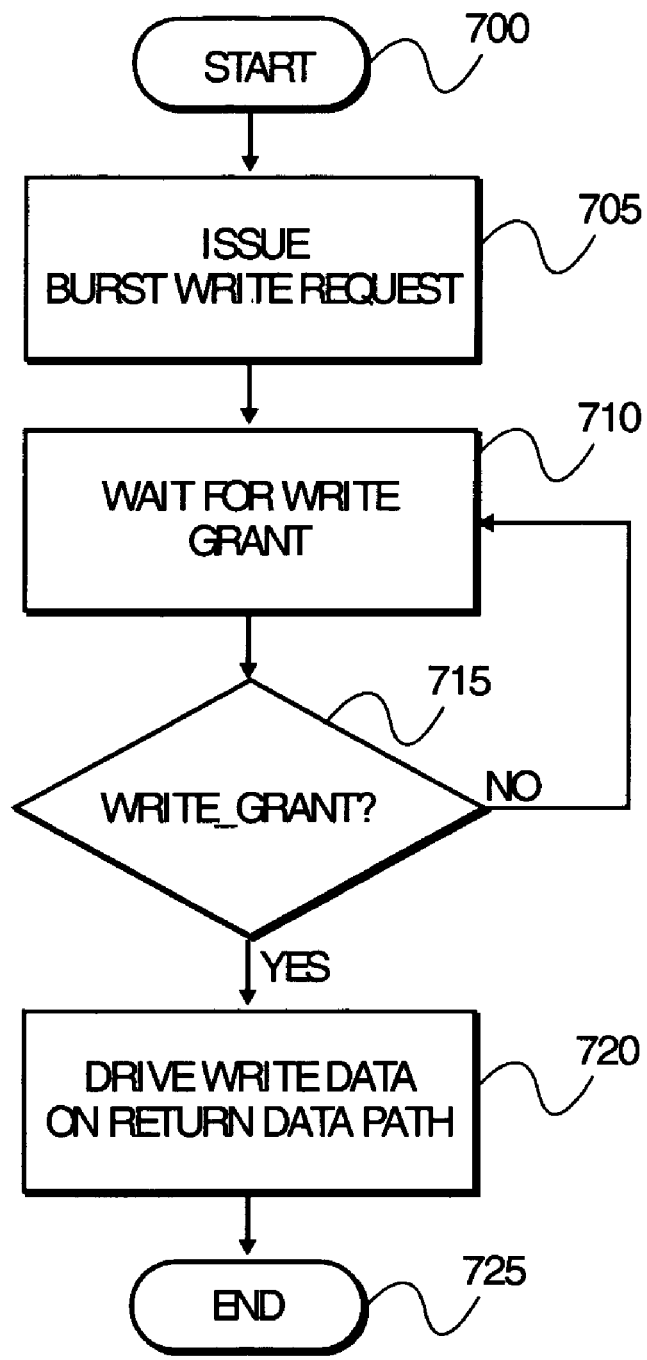
FIG. 7 is a flow diagram illustrating one embodiment of a CSL burst write process.

FIG. 7 is a flow diagram illustrating one embodiment of a CSL burst write process. If the last transaction issued by the BMU was a write transaction, then the CSL device can subsequently perform burst write transactions. The process starts at block 700. The CSL device initiates the burst write transaction by issuing a burst request, as shown in block 705. The direction of this transaction is implicitly determined by the direction of the last transaction completed by the BMU. In this case, because the last transaction was a "write", the direction of the burst request is similar to that of a "write". The address is implicitly determined from the address of the last transaction, which may be incremented by some amount dependent on the burst settings for that channel. Since the address is implicit, there is no address grant phase.

At block 710, the CSL device waits for a write grant command from the BMU. At block 715, a determination is made to see if the write grant command is received. If the write grant command is not received, the process flows from block 715 back to block 710 where the CSL device continues to wait. When the BMU receives the write request, it will issue a write grant command to the CSL device. From block 715, when the write grant command is received, the process flows to block 720 where the CSL device provides the write data on the return data path. The BMU then writes the data to the determined address. The process is completed and ends at block 725. In one embodiment, the CSL device is able to issue burst requests that can be serviced in one cycle in order to optimize performance.

Figure 8:
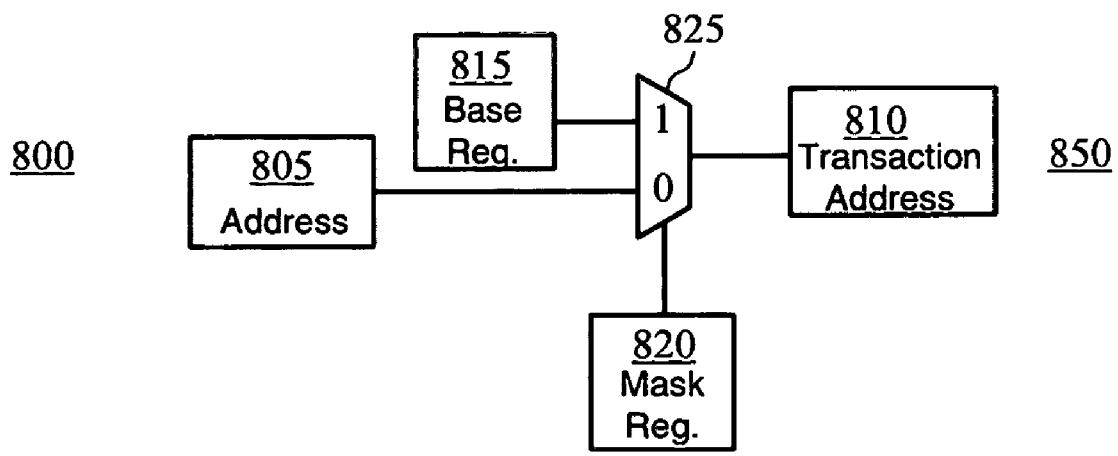
FIG. 8 is a block diagram that illustrates one embodiment of determining a transaction address.

The BMU may not require access to a full 32-bit address space, and thus having a CSL design to drive a full 32-bit address will in most cases waste CSL resources. Conversely, it is hard to place an upper limit on the address range that will be required for all BMU designs. FIG. 8 is a block diagram that illustrates one embodiment of determining a transaction address. Each BMU channel has a 32-bit base register 815 and a 32-bit mask register 820. For each bit of the transaction address 810 to the CSI 850, the corresponding value in the 32-bit mask register 820 will determine if the value of that bit should be taken from the 32-bit base register 815 or from the address 805 delivered by the CSL device 800. This decision is performed in block 825. This implicitly provides a degree of memory protection since the range of transaction addresses 810 which can be generated by the BMU is restricted by the value in the mask register 820.

During the address phase of the read or the write transaction, the BMU stores the address, direction (read or write) and size (byte, half word or word) of the transaction. In one embodiment, each BMU channel has a "burst increment" bit associated with it. The burst increment bit indicates if burst addresses should increment for that channel. Each BMU channel also has a "last address" register and a "last direction" bit, which record the address and direction of the last transaction on that channel. For example, if the "burst increment" bit is a zero (or reset), the implied address, direction and size of a burst transaction will be the same as the last stored transaction. Alternatively, if the "burst increment" bit is a one (or set), then the direction and size of a burst transaction will be the same as the last stored transaction and the address will be that of the last transaction incremented by the transaction size such as, for example, 4 for word, 2 for half word and 1 for byte. The burst address is multiplexed with the 32-bit base register 815 based on the value of the 32-bit mask register 820 in the same way that a non burst address is.

In one embodiment, the BMU supports the same transaction sizes as the CSI bus (e.g., 32 bit word, 16 bit half word, 8 bit byte). In another embodiment, a default transaction size is one byte.

The CSL device can provide the transaction size information during the address grant phase. In one embodiment, each BMU channel has a "transaction size" bit such that when the "transaction size" bit is set, the upper two bits of the return data path during the address grant phase are interpreted as a size request. When the "transaction size" bit is not set, the entire 32 bits in the return data path is used and a default transaction size may be used. The following table illustrates the use and interpretation of the "transaction size" bit.

| Transaction Size bit | Interpretation of return data during address grant phase |
|---|---|
| 0 | Address[31:0] |
| 1 | Size[1:0], Address[29:0] |

The following table illustrates how the upper two bits are interpreted when the transaction size bit is set (1).

| Size[1] | Size[0] | Transaction Size |
|---|---|---|
| 0 | 0 | Byte |
| 0 | 1 | Half Word |
| 1 | 0 | Word |
| 1 | 1 | Word |

This encoding scheme allows the selection between any pair of sizes using only one bit.

The above section concerns size request provided by the CSL device. The BMU also delivers the size information when the BMU sends data to the CSL device. The BMU delivers the size information during the read grant and the write grant phases of the transaction. This allows normal selector logic to handle the transaction sizes rather than requiring the BMU to store the requested transaction size and then handle the grant separately.

The operations of the various methods of the present invention may be implemented by a processing unit in a digital processing system, which executes sequences of computer program instructions which are stored in a memory which may be considered to be a machine readable storage media. The memory may be random access memory, read only memory, a persistent storage memory, such as mass storage device or any combination of these devices. Execution of the sequences of instruction causes the processing unit to perform operations according to the present invention. The instructions may be loaded into memory of the computer from a storage device or from one or more other digital processing systems (e.g. a server computer system) over a network connection. The instructions may be stored concurrently in several storage devices (e.g. DRAM and a hard disk, such as virtual memory). Consequently, the execution of these instructions may be performed directly by the processing unit.

In other cases, the instructions may not be performed directly or they may not be directly executable by the processing unit. Under these circumstances, the executions may be executed by causing the processor to execute an interpreter that interprets the instructions, or by causing the processor to execute instructions which convert the received instructions to instructions which can be directly executed by the processor. In other embodiments, hard-wired circuitry may be used in place of or in combination with software instructions to implement the present invention. Thus, the present invention is not limited to any specific combination of hardware circuitry and software, nor to any particular source for the instructions executed by the computer or digital processing system.

From the above description and drawings, it will be understood by those of ordinary skill in the art that the particular embodiments shown and described are for purposes of illustration only and are not intended to limit the scope of the invention. Those of ordinary skill in the art will recognize that the invention may be embodied in other specific forms without departing from its spirit or essential characteristics. References to details of particular embodiments are not intended to limit the scope of the claims.

What is claimed is:

1. A system, comprising:
    a processor;
    a configurable system interconnect (CSI) bus coupled to the processor;
    a configurable system logic (CSL) device, comprising programmable functions and programmable interconnections, coupled to the CSI bus;
    dedicated signal lines separate from the CSI bus and coupled to the configurable system logic device, the dedicated signal lines comprising a first set of dedicated signal lines used to transmit commands from the CSL device and a second set of dedicated signal lines to receive commands at the CSL device;
    a direct memory access (DMA) controller coupled to the first set of dedicated signal lines and the second set of dedicated signal lines; and
    a bus master unit (BMU) coupled to the CSI bus, and coupled to the CSL device via the first set of dedicated signal lines used to receive commands at the BMU from the CSL device and the second set of dedicated signal lines to transmit grant commands from the BMU to the CSL device, wherein the BMU arbitrates to take control of the CSI bus on behalf of the CSL device enabling the CSL device to perform data transfers to or from the CSI bus when the BMU is selected for bus mastering and wherein the CSL device selectively receives the grant signal only the BMU or from the DMA controller.

2. The system of claim 1, wherein the data transfer request is one in a group consisting of a read request, a write request, and a burst request.

3. The system of claim 2, wherein after the CSL device issues the read request using the first set of dedicated signal lines, the CSL device sends a read address to the BMU after receiving an address grant from the BMU through the second set of dedicated signal lines.

4. The system of claim 3, wherein the CSL device further reads data from the CSI bus after receiving a read grant from the BMU through the second set of dedicated signal lines, the data read from the CSI bus corresponding to the read address.

5. The system of claim 3, wherein the CSL device sends transaction size information in addition to the read address.

6. The system of claim 2, wherein after the CSL device issues the write request using the first set of signal lines, the CSL device sends a write address to the BMU after receiving an address grant from the BMU through the second set of dedicated signal lines.

7. The system of claim 6, wherein the CSL device further places write data on the CSI bus after receiving a write grant from the BMU through the second set of dedicated signal lines, the write data placed on the CSI bus corresponding to the write address.

8. The system of claim 6, wherein the CSL device sends transaction size information in addition to the write address.

9. The system of claim 2, wherein when the CSL device issues the burst request, direction of the data transfer associated with the burst request is similar to direction of a previous data transfer request.

10. The system of claim 9, wherein an address associated with the burst request is determined from an address associated with the previous data transfer request.

11. The system of claim 10, wherein the CSL device sends transaction size information in addition to the burst request.

12. The system of claim 11, wherein when the previous data transfer request is associated with the read request, the CSL device reads data from the CSI bus after receiving a read grant from the BMU.

13. The system of claim 11, wherein when the previous data transfer request is associated with the write request, the CSL device places write data on the CSI bus after receiving a write grant from the BMU.

14. The system of claim 1, wherein the first set of dedicated signal lines and the second set of dedicated signal lines are point-to-point lines.

15. A system, comprising:
a configurable system logic (CSL) means comprising programmable functions and programmable interconnections;
a configurable system interconnect (CSI) bus coupled to the CSL means;
a direct memory access (DMA) controller means for responding to a request from the CSL means;
a bus master controller means for responding to a request from the CSL means and for arbitrating and controlling the CSI bus on behalf of the CSL means enabling the CSL means to perform data transfers to or from the CSI bus;
a first set of dedicated signal lines separate from the CSI bus coupled between the CSL means and each of the DMA controller means and the bus master controller means to transmit data transfer request signals from the CSL means to the DMA controller means and the bus master controller means;
a second set of dedicated signal lines separate from the CSI bus coupled between the CSL means and each of the DMA controller means and the bus master controller means to selectively receive grant signals associated with the data transfer request signals from one of the DMA controller means or the bus master controller means at the CSL means.

16. The system of claim 15, wherein the data transfer request signals indicate a read request, a write request, or a burst request.

17. The system of claim 15, wherein the CSL means includes:
means for sending an address to the bus master controller;
means for waiting for the grant signals from the bus master controller; and
means for reading data from or placing data on the CSI bus.

18. The system of claim 17, wherein the CSL means further includes means for specifying a transaction size.

19. The system of claim 15, wherein the bus master controller means includes:
means for receiving data transfer request signals from the CSL means;
means for receiving an address from the CSL means; and
means for sending grant signals to the CSL means.

20. The system of claim 19, wherein the grant signals include read grant signals, write grant signals and address grant signals.

21. An apparatus, comprising:
a bus mastering unit (BMU) coupled to a configurable system logic (CSL) device, having programmable functions and programmable interconnections, via a first set of dedicated signal lines used to receive data transfer commands from the CSL device and a second set of dedicated signal lines to transmit grant commands to the CSL device, the BMU configured to arbitrate and control a configurable system interconnect (CSI) bus, separate from the first set of dedicated signal lines and the second set of dedicated signal lines, to enable the CSL device to perform a data transfer to or from the CSI bus;
a DMA controller coupled to the CSL device by way of the first set of dedicated signal lines and the second set of dedicated signal lines; and
a multiplexing circuit coupled to the BMU and the DMA controller, the multiplexing circuit selecting a grant command from one of the BMU or the DMA controller.

22. The apparatus of claim 21, wherein the data transfer request is one in a group consisting of a read request, a write request, and a burst request.

23. The apparatus of claim 22, in response to receiving the data transfer request, the BMU sends grant signals to the CSL device using the second set of dedicated signal lines.

24. The apparatus device of claim 23, wherein when the data transfer request is the read request, the grant signals from the BMU includes an address grant and subsequently a read grant.

25. The apparatus of claim 23, wherein when the data transfer request is the write request, the grant signals from the BMU include an address grant and subsequently a write grant.

26. The apparatus of claim 23, wherein when the data transfer request is the burst request, the grant signals from the BMU includes a read grant if a previous data transfer was associated with a read request or a write grant if the previous data transfer was associated with a write request.

27. The apparatus of claim 22, wherein when the data transfer request is the read request or the write request, the CSL device further sends an address associated with the data transfer request to the BMU, and wherein the data transfer request is the burst request, the BMU determines the address based on a previous data transfer request.

28. A method, comprising:
providing a first set of dedicated signal lines coupled to a direct memory access (DMA) controller and a bus mastering unit (BMU) to transmit data transfer request signals from a configurable system logic (CSL) device, having programmable functions and programmable interconnections, to the DMA controller and the BMU;
providing a second set of dedicated signal lines coupled to the DMA controller and the BMU to selectively receive grant signals associated with the data transfer request signals from one of the DMA controller or the BMU at the CSL device;
initiating a data transfer request, the data transfer request transmitted from the CSL device to the BMU, using the first set of dedicated signal lines, the CSL device and the BMU connected to the configurable system interconnect (CSI) bus, wherein the first and second set of dedicated signal lines are separate from the CSI bus;
configuring the second set of dedicated signal lines to selectively couple a response from one of the BMU or the DMA controller to the CSL device;
transmitting an address to the BMU after receiving an address grant from the BMU via the second set of dedicated signal lines, the address corresponding to a starting address for a data transfer;
if the data transfer request is in a direction from the CSI bus to the CSL device, reading data from the CSI bus after receiving a read grant from the BMU; and
if the data transfer request is in a direction from the CSL device to the CSI bus, placing the data on the CSI bus after receiving a write grant from the BMU.

29. The method of claim 28, further comprising sending a transaction size to the BMU.

30. The method of claim 29, wherein when the data transfer request is a burst request, instead of sending the address to the BMU, the address is determined based on a previous data transfer request received by the BMU.

31. The method of claim 29, wherein a data transfer direction of the burst request is similar to a data transfer direction of a previous data transfer request.

32. A system, comprising:
a bus mastering means for arbitrating to take control of a configurable system interconnect (CSI) bus on behalf of a configurable system logic (CSL) device, having programmable functions and programmable interconnections connected to the CSI bus to enable the CSL device to perform data transfer to or from the CSI bus bypassing participation of a processor;
means for providing dedicated signal lines between the CSL device and the bus mastering means and separate from the CSI bus to enable the data transfer to or from the CSI buss;
a DMA controller means coupled to the CSL device by way of the means for providing dedicated signal lines; and
means for selecting a data transfer grant signal from either the bus mastering means or the DMA controller means to be coupled to the CSL device.

33. The system of claim 32, wherein the means for the CSL device to communicate with the bus mastering means comprises means for sending addresses and transaction size associated with the data transfer.

34. The system of claim 33, further comprising means for handling burst data transfer.

35. A system, comprising:
a bus mastering means coupled with configurable system logic (CSL), having programmable functions and programmable interconnections, through a set of dedicated request signal lines and a set of dedicated grant signal lines, the bus mastering means configured to arbitrate and control a configurable system interconnect (CSI) bus separate from the set of dedicated request signal lines and the dedicated grant signal lines to enable the CSL means to perform a data transfer to or from the CSI bus, the CSL means initiating the data transfer by issuing a data transfer request to the bus-mastering means using the set of dedicated request signal lines;
a DMA controller means coupled to the CSL means by way of the set of dedicated request signal lines and the set of dedicated grant signal lines; and
a means for selecting a data transfer grant signal from either the bus mastering means or the DMA controller to be coupled to the CSL means.

36. The system of claim 35, wherein the data transfer request is one in a group consisting of a read request, a write request, and a burst request.

37. The system of claim 36, in response to receiving the data transfer request, the bus-mastering means sends grant signals to the CSL means using the set of dedicated grant signal lines.

38. The system of claim 37, wherein when the data transfer request is the read request, the grant signals from the bus-mastering means includes an address grant and subsequently a read grant.

39. The system of claim 37, wherein when the data transfer request is the write request, the grant signals from the bus-mastering means includes an address grant and subsequently a write grant.

40. The system of claim 37, wherein when the data transfer request is the burst request, the grant signals from the bus-mastering means includes a read grant if a previous data transfer was associated with a read request or a write grant if the previous data transfer was associated with a write request.

41. The system of claim 36, wherein when the data transfer request is the read request or the write request, the CSL means further sends an address associated with the data transfer request to the bus-mastering means, and wherein the data transfer request is the burst request, the bus-mastering means determines the address based on a previous data transfer request.

* * * * *